(12) United States Patent
Hsu

(10) Patent No.: US 7,882,395 B2
(45) Date of Patent: Feb. 1, 2011

(54) DEBUG DEVICE FOR EMBEDDED SYSTEMS AND METHOD THEREOF

(75) Inventor: Po-Chun Hsu, Shetou Township, Changhua County (TW)

(73) Assignee: Universal Scientific Industrial Co., Ltd., Nan-Tou (TW)

( * ) Notice: Subject to any disclaimer, the term of this patent is extended or adjusted under 35 U.S.C. 154(b) by 421 days.

(21) Appl. No.: 12/071,731

(22) Filed: Feb. 26, 2008

(65) Prior Publication Data
US 2009/0217105 A1    Aug. 27, 2009

(51) Int. Cl.
*G06F 11/00* (2006.01)
(52) U.S. Cl. ...................................................... 714/31
(58) Field of Classification Search ............. 714/25–32, 714/34–39, 45–48, 56, 57
See application file for complete search history.

(56) References Cited

U.S. PATENT DOCUMENTS

| | | | |
|---|---|---|---|
| 5,826,105 A * | 10/1998 | Burstein et al. ............... 710/22 |
| 6,658,600 B1 * | 12/2003 | Hogdal et al. .................. 714/33 |
| 6,803,785 B1 * | 10/2004 | May et al. ...................... 326/39 |
| 6,889,346 B2 * | 5/2005 | Abdelilah et al. ............. 714/46 |
| 6,948,098 B2 * | 9/2005 | Pillay et al. .................... 714/34 |
| 7,441,158 B1 * | 10/2008 | Legako et al. ................. 714/46 |
| 7,712,084 B2 * | 5/2010 | Beuten et al. ................ 717/129 |
| 2006/0053343 A1 * | 3/2006 | Hayem ......................... 714/39 |
| 2006/0190769 A1 * | 8/2006 | Doddapaneni et al. ........ 714/38 |

* cited by examiner

*Primary Examiner*—Nadeem Iqbal
(74) *Attorney, Agent, or Firm*—Kile Goekjian Reed & McManus PLLC

(57) ABSTRACT

A debug device of embedded systems is provided. The embedded system includes an embedded processor for reading a bootloader from a flash memory through a data flash interface. The debug device includes a memory transmission interface, a dada storage module, a data control module and a display module. The memory transmission interface is configured to couple the data flash interface for receiving data to the data storage module. The data control module determines whether the data stored in the data storage module is data from a data bus or from the data flash interface according to whether a data control signal of the data flash interface has been triggered. The display module displays the data of the data storage module.

20 Claims, 4 Drawing Sheets

DEBUG DEVICE FOR EMBEDDED SYSTEMS AND METHOD THEREOF

BACKGROUND OF THE INVENTION

1. Field of the Invention

The present invention relates to a debug device, in particular, to a debug device for embedded systems and a method thereof.

2. Description of Related Art

Inside a computer system is installed a Basic Input/Output System (BIOS), which is responsible for performing the Power-On Self-Test (POST) procedure to the computer system. It is possible to assign a code to this procedure at each test point, so as to output to a specific input/output (I/O) port (e.g. I/O port 80), and such codes represent respectively a corresponding failure reason.

Hence, the current method for debugging the BIOS of a computer system is to link to the Peripheral Component Interconnect (PCI) or Industry Standard Architecture (ISA) interface on a computer motherboard through a debug card, in which such a debug card provides the display circuit, and when the BIOS performs the POST procedure and a hardware error occurs, the debug card can acquire the code of the corresponding test point for the hardware failure during the POST procedure via the connected interface, and display this code on the display circuit in the debug card, such that related technicians can be aware of the computer hardware failure and perform a debug process by means of the displayed code on the debug card.

However, for embedded systems, there is no BIOS installed inside, which is different from computer systems. Hence, when debugging an embedded system a method as described above for computer systems cannot be used. Besides, the processors used in embedded systems may differ from those in computer systems since processor vendors adopt various interfaces, and thus the entire development of embedded systems could be inevitably full of difficulties and challenges.

Although the embedded system implemented by means of the present Marvell PXA320 processor can perform single-step debug through RS-232 transmission, this approach simply displays the instructions currently executed by the embedded system onto a display interface, whereas in terms of debugging, it is impossible to pinpoint the location of hardware failure in the embedded system through the displayed instructions.

SUMMARY OF THE INVENTION

The technical issues at which the present invention aims are to provide a debug device for embedded systems and a method thereof, which is able to output and display the data generated by the embedded system boot status, so as to learn about the reasons of problems occurred inside the embedded system and to perform debug.

In order to solve the above-mentioned technical problems, a solution in accordance with the present invention provides a debug device for embedded system, wherein, in the embedded system, a embedded processor reads a boot program from a flash memory through a data flash interface in order to execute a boot process, the data flash interface is a type of serial interface, and the debug device includes: a memory transmission interface, which is coupled to the data flash interface, and used to receive the data transmitted by the data flash interface; a data storage module, which is coupled to the memory transmission interface, and used to store the data received via the memory transmission interface; a data control module, which is coupled to the memory transmission interface, and, upon triggered by the data control signal in the data flash interface, stores the data transmitted through the data bus of the data flash interface in the data storage module; and a display module, which is coupled to the data control module, and used to receive the control from the data control module, so as to output and display the data stored in the data storage module.

In order to solve the above-mentioned technical problems, another solution in accordance with the present invention provides a debug method for embedded system, wherein, in the embedded system, a embedded processor reads a boot program from a flash memory through a data flash interface in order to execute a boot process, the data flash interface is a type of serial interface, and the debug method includes: during the execution of boot process by the embedded system, providing a debug device to determine whether the data control signal in the data flash interface is triggered; when determined as triggered, storing, by means of the debug device, the data transmitted through the data bus in the data flash interface to a data storage module; next, encoding the data stored in the data storage module; and outputting the encoded data to a display module for display.

In order to solve the above-mentioned technical problems, still another solution in accordance with the present invention provides a debug method for embedded system, wherein, in the embedded system, a embedded processor reads a boot program from a flash memory through a data flash interface in order to execute a boot process, the data flash interface is a type of serial interface, and the debug method includes: providing a debug device to determine whether the data flash interface is idle; when the data flash interface is found idle, the debug device triggering a debug card program detection signal to the embedded system; the debug device outputting a memory address to a data bus in the data flash interface; the debug device determining whether the memory data read control signal in the data flash interface is triggered; when the memory data read control signal is found to be triggered, the debug device storing the data on the data bus of the data flash interface in a data storage module; next, encoding the data stored in the data storage module; and outputting the encoded data to a display module for display.

Thus, in accordance with the above-mentioned implementation method, the present invention can, by means of a debug device, read the data transmitted through a data bus on the data flash interface of the embedded system, and, by means of determining whether the data control signal is triggered, confirm whether the data transmitted through the data bus on the data flash interface can be stored for facilitating debug process.

The above-mentioned summary and the following detailed descriptions as well as appended drawings are to further explain the fashions, measures and effects to achieve the prescribed purposes. Other objectives and advantages of the present invention will be illustrated in the subsequent descriptions and figures.

DETAILED DESCRIPTION OF PREFERRED EMBODIMENTS

The present invention provides a debug device for performing debug on an embedded system, such that during development of the embedded system, it is possible by means of debugging, to know the data, addresses, hardware status and other relevant results occurring during booting of the embedded system, and to use the obtained information for solving the problems encountered during hardware development. The present invention reads by means of the debug device the process results from the internal boot execution of the embedded system, and by means of outputting and displaying such process results, enables debug technicians to perform debugging.

Figure 1:
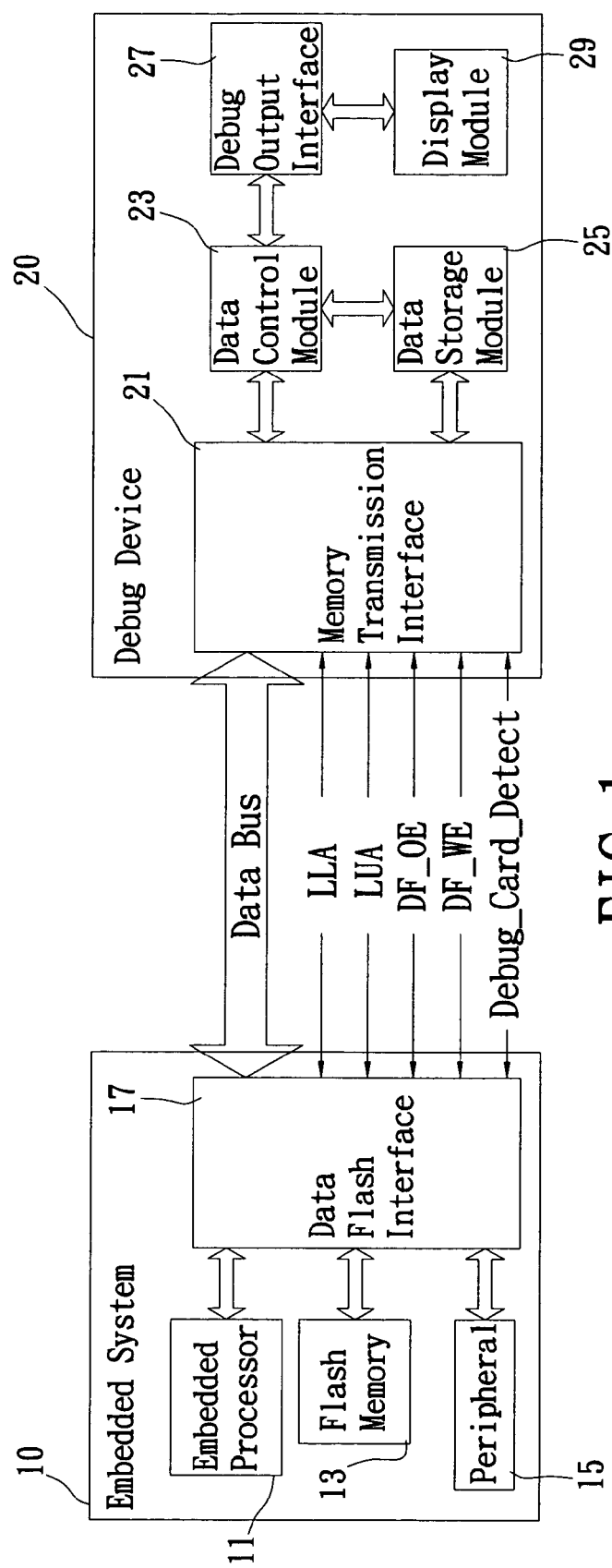
FIG. 1 shows a function block diagram of a debug device for an embedded system in accordance with a preferred embodiment of the present invention.

Referring to FIG. 1, the shown embodiment illustrates a function block diagram of the debug device in accordance with the present invention. The debug device 20 shown in the embodiment is coupled to an embedded system 10, and in order to enable the debug device 20 to successfully read the relevant execution results about the booting of the embedded system 10, the bootloader of the embedded system 10 is configured to have at least one test point, which is mainly used to record the execution results concerning portions to be debugged during the embedded system 10 booting at a storage position internally set in the embedded system 10. For example, during the embedded system 10 boot process, the bootloader may assign a piece of memory position in the flash memory when executing test points, and such a position is specifically used to record the values of execution results in each peripheral devices, such that a specific memory address in the flash memory is used to store the hardware status of a corresponding peripheral device (e.g. if it is normal or not). Therefore, the debug device 20 can, by means of interfaces compatible with the embedded system 10, read the memory data stored at specific memory addresses within this embedded system 10, and the read data can thus used to perform debug process.

The embedded system 10 of the present invention includes various principal elements, e.g. the embedded processor 11, the flash memory 13 and the data flash interface (DFI) 17 etc. Here, by way of examples, according to different design demands of the embedded system 10, the embedded system 10 still possibly further contains additional hardware elements. The embedded system 10 uses the data flash interface 17 to couple to the embedded processor 11, the flash memory 13 and the peripheral device 15, so as to provide internal data transmission channels for the system. The data flash interface 17 employs serial interface technology to transmit data, which consists of a control bus for data control signal transmissions, as well as a data bus for memory address and memory data transmissions, wherein the control bus refers to a memory address control line (LLA, LUA), used to transmit memory address control signals. A memory data read control line (DF_OE) and a memory data write control line (DF_WE) are used to transmit memory data and read/write control signals, and a debug card program detection line (Debug_Card_Detect) allows the debug device 20 to output a debug card program detection signal to the embedded system 10, whereas in the data bus it will be determined whether the data line transmits a memory address or memory data, based on whether any signal triggering exists in the control bus or not.

In the embedded system 10, the flash memory 13 stores the bootloader, the embedded processor 11 reads the bootloader in the flash memory 13 through the data flash interface 17 in order to execute a boot process, and the embedded processor 11 also performs the actions of initialization on the peripheral devices 15 during boot process, so as to know whether the current hardware status is normal. When the bootloader, during its execution process, executes to a text point, it may store the execution results of a specific boot execution item back to a particular memory address specified in the flash memory 13.

Referring again to FIG. 1, the debug device 20 includes a memory transmission interface 21, a data control module 23, a data storage module 25, a debug output interface 27 and a display module 29. The memory transmission interface 21 is compatible with the data flash interface (DFI) 17 of the embedded system 10, which can be used to receive and transmit the data sent on the control bus and data bus in the data flash interface 17; the data storage module 25 is couple to the memory transmission interface 21, which allows to store the data received from the memory transmission interface 21; the data control module 23 is coupled to the memory transmission interface 21, the data storage module 25 and the debug output interface 27, providing relevant process operations such as data reading, data transmission, data storage, data encoding, data decoding and data display etc.; the debug output interface 27 is externally connected to a computer system (not shown), which can be used to output the process results from the data control module 23 to the computer system for further analysis by means of the powerful capability of the computer system; the display module 29 is coupled to the data control module 23 via the debug output interface 27, which can be used to output and display the process results from the data control module 23, wherein the display module 29 can be a seven-section display module with a multi-digital display.

Since the flash memory 13 of the embedded system 10 stores the test point execution results of the bootloader, for the debug device 20, so long as it can read the boot execution results stored in the flash memory 13, the read data can be thus used for debugging. Whereas in terms of the data transmission inside the embedded system 10, it is mainly by way of the data flash interface 17, that is, the boot execution results stored with the flash memory 13 will be transmitted via the data flash interface 17, hence the debug device 20 of the present embodiment can acquire relevant data for debugging by means of reading the data transmitted through the data flash interface 17 of the embedded system 10.

Figure 2:
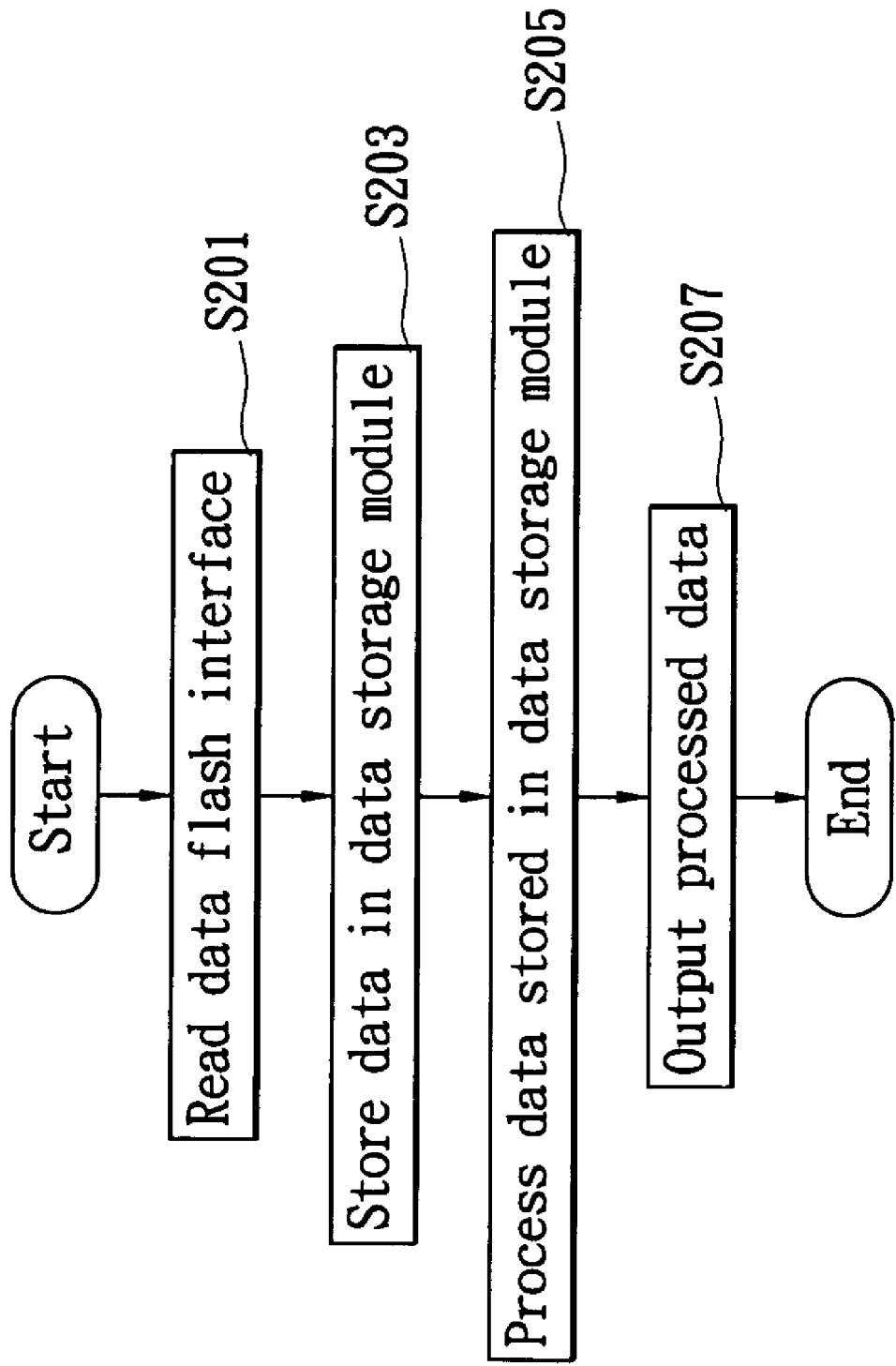
FIG. 2 shows a flowchart of the debug method of the present invention.

Now, in conjunction with FIG. 1, referring to FIG. 2, which illustrates a flowchart of debug method according the present invention, whose execution steps are shown as below.

The debug device 20, through the memory transmission interface 21, reads the data transmitted via the data flash interface 17 (as step S201); the debug device 20 stores the read data to the data storage module 25 (as step S203); then, the data control module 23 processes the data in the data storage module 25 (as step S205), wherein the process of this step concerns mainly, by means of decoding, recovering the data in the data storage module 25 into the raw data suitable for debugging, and encoding such raw data into output data suitable for display and for computer system analysis; finally, output the output data processed by the data control module 23 (as step S207), wherein the output data can be sent to the display module 29 for display, or to the computer system for further analysis through the debug output interface 27, hence by means of the display on the display module 29 or the analysis in the computer system, it is possible to achieve the objective of debug process.

Next it will further explain how the debug device 20 performs a debug process during booting the embedded system 10. In conjunction with FIG. 1, refer now to FIG. 3, wherein a flowchart of debug process for the embedded system booting in accordance with the present invention is shown.

To start, the debug device 20 first is initiated and initialization actions are performed, then the debug device 20 becomes idle and enters into waiting mode (as step S301); while the embedded system 10 executes boot process, the data control module 23 in the debug device 20 determines whether the data control signal of the data flash interface 17 is triggered (as step S303). In case the result is negative, the flow returns to step S301 and carries on; whereas if the result is positive, then it will further determine whether the triggering is categorized as triggering of a memory address control signal (LLA, LUA) in data control signal (as step S305), or as triggering of a memory data read/write control signal (DF_OE, DF_WE) in data control signal (as step S313).

When the result in S305 is yes, it means the transmitted data currently on the data bus of the data flash interface 17 belongs to the memory address, the data control module 23 will identify the transmitted data on the data bus of the data flash interface 17 as memory address, and store it in the data storage module 25 (as step S307).

If the result in step S313 it is yes, this indicates that the transmitted data on the data bus of the data flash interface 17 belongs to memory data, the data control module 23 will identify the transmitted data on the data bus of the data flash interface 17 as memory data, and store it in the data storage module 25 (as step S315).

After steps S307 and S315, the data control module 23 reads the memory address and data in the data storage module 25, and encodes these items into output data suitable for output and display (as step S309), then outputs the encoded data to the display module 29 for display (as step S311); additionally, the data control module 23 may also encode the memory address and data in the data storage module 25 into output data for computer process, then send the output data to the computer system through the debug output interface 27.

Figure 3:
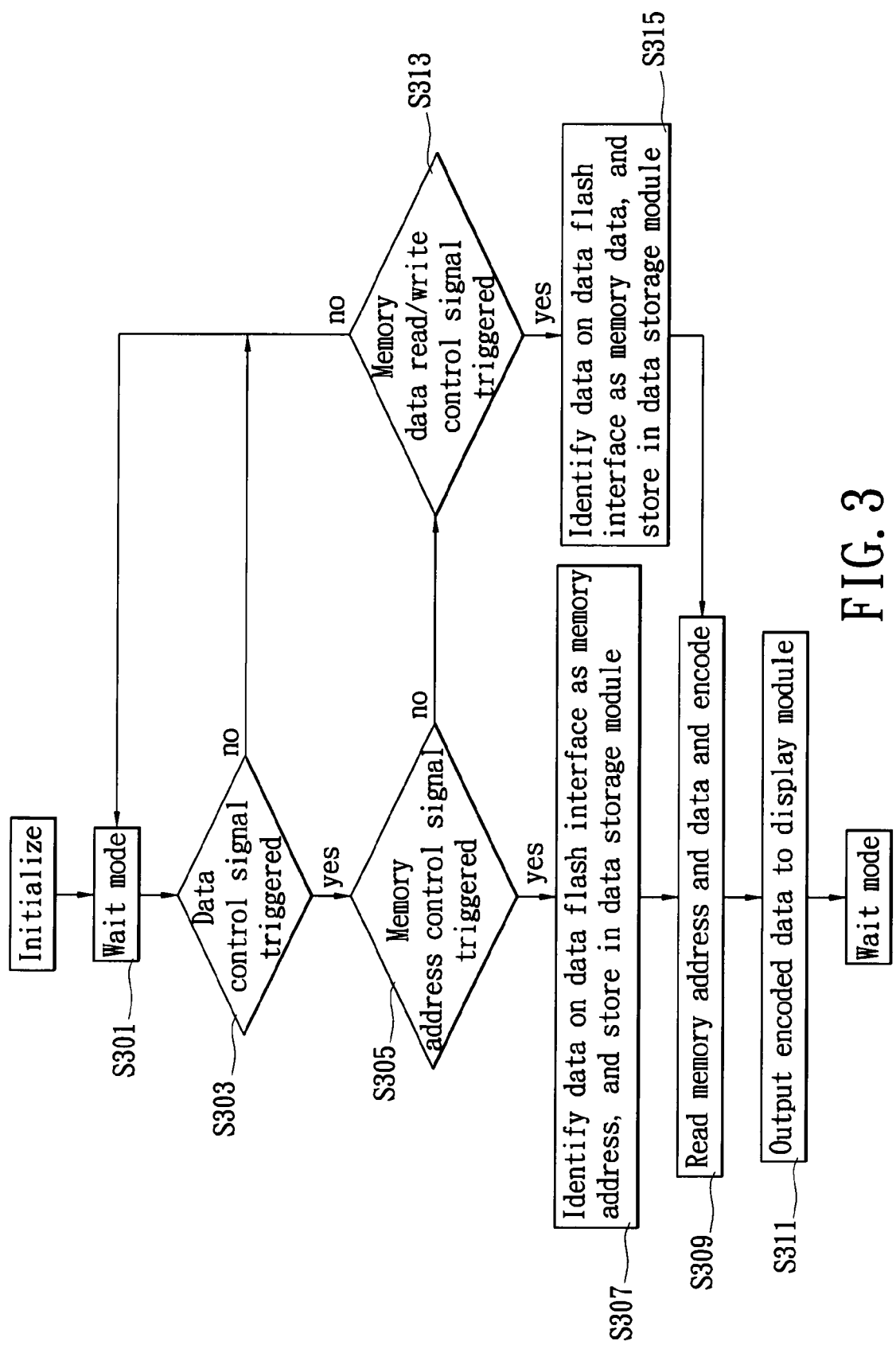
FIG. 3 shows a debug flowchart of the present invention, which specifically addresses to an embedded system boot time.

Here in FIG. 3, when steps S307 and S315 end, the debug device at this moment has already stored a complete set of data for the flash memory 13 of the embedded system 10 (including memory address and memory data), and as soon as the embodiment executes steps S307 and S315, it will also determine whether this set of data is applicable to the determination actions in the debug process, such as if, determined by the data control module 23, the memory address in this set of data is identical to the memory address stored in the flash memory 13 specified by the test point of the bootloader, then this set of data will be recognized as useful data for debugging, and hence stored in the data storage module 25.

While there still exist other sets of data for debug process, the control will return to step S303 and repeat the above-mentioned steps, until all data suitable for debugging are stored in the data storage module 25.

Figure 4:
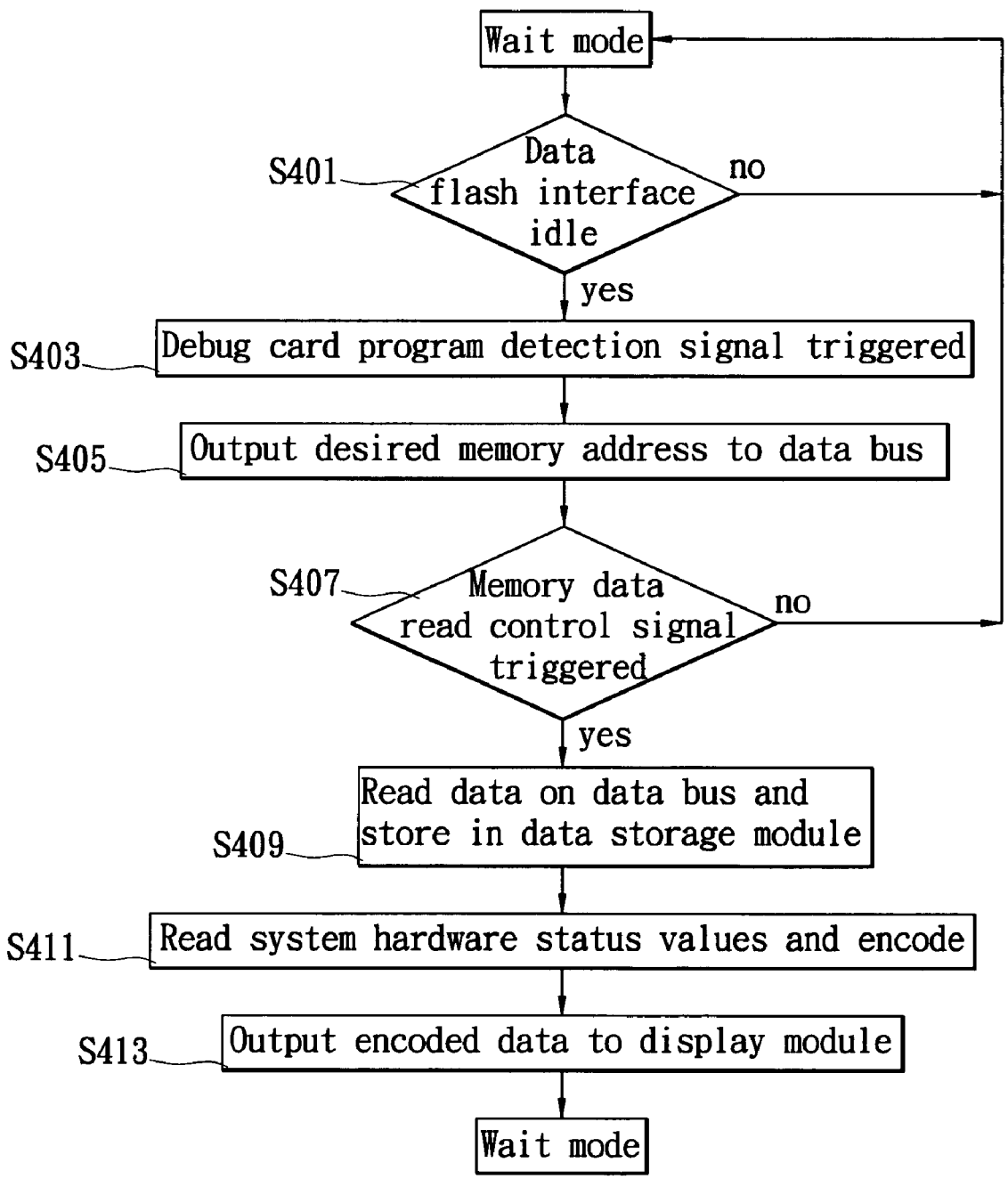
FIG. 4 show a debug flowchart of the present invention, which actively reads internal data of the embedded system.

The implementation method in above FIG. 3 is, during the boot process of the embedded system 10, to acquire boot related data for decision making from the data flash interface 17 of the embedded system 10 for debugging; however, the present invention may also, after the booting of the embedded system 10 is completed, actively read relevant data (e.g. hardware status values) from inside the embedded system 10 to perform debug process. As depicted in FIG. 4, and in conjunction with FIG. 1, a flowchart of debug method according to the present invention which actively reads the internal data of the embedded system 10 is shown, whose execution steps are set out as below.

When the debug device 20 is in waiting mode, the debug device 20 determines whether the data flash interface 17 of the debug device 20 is idle (as step S401), such a decision step can be that the data control module 23 determines whether there exists any data transmission on the data bus of the data flash interface 17, and in the case no data transmission, the data flash interface 17 can be identified as being idle.

When the result of step S401 is yes, the debug device 20 sends a signal to trigger the debug card program detection signal in the memory interface (as step S403), such that the embedded system 10 can prepare to perform memory data reading actions based on the received debug card program detection signal, then the debug device 20 outputs the desired memory address to the data bus in the data flash interface 17 (as step S405), here the desired memory address is the one in which the embedded system 10 stores the hardware status value in the flash memory 13, and at this moment the embedded system 10 can acquire the memory address provided by the debug device 20 through the data bus in the data flash interface 17.

After that, the debug device 20 determines whether the memory data read control signal of the data flash interface 17 in the embedded system 10 is triggered (as step S407), if the result is yes, this means the embedded system 10 has received the memory address and has triggered the memory data read control signal of the data flash interface 17, the embedded system 10 then, through the data bus of the data flash interface 17, reads the data located at such an address in the flash memory 13 and the debug device 20 at the same time reads the data in the data bus of the data flash interface 17, then stores the data in the data storage module 25 (as step S409), wherein the data stored in step S409 is the hardware status value located at the desired memory address output in step S405.

Subsequently, the data control module 23 of the debug device 20 reads the hardware status value in the data storage module 25 and encodes (as step S411), then outputs the encoded data to the display module 29 for display (as step S413). Similarly, the data control module 23 may also encode the hardware status value in the data storage module 25 as output data for further computer process, and output to the computer system via the debug output interface 27.

In summary, the debug device 20 provided by the illustrated embodiment can perform debug process on the embedded system 10, and since the data flash interface 17 of the embedded system 10 is a type of serial transmission interface, there is no exclusive address line and data line; rather, it uses shared transmission lines to transmit, hence there exists difficulties to a certain degree for doing debug. Thus the present embodiment, through a determining mechanism, determines first whether the data control signal of the data flash interface 17 is triggered, and next of which type the triggered signal is (memory address control signal or memory read/write control signal), then according to the result, further successfully acquires and identifies the suitable debug data on the data bus in the data flash interface 17, in which such suitable debug data may be the memory address or memory data contained in the boot process of the embedded system 10 or else the current hardware status of the embedded system 10.

After acquisition of debug data, the debug device 20 of the present embodiment can encode the data for outputting and display on the display module 29, or can output to a computer system for back-end analysis, thus by means of the debug method provided by the present invention, it is possible to solve the problems of not able to perform normal booting during the development of the embedded system 10.

The figures and descriptions disclosed in the specification are merely the embodiments of the present invention, those skilled in the art can, based on the illustrated descriptions and figures, make various amendments, modifications and changes, without departing from the scope and spirit of the present invention, as defined in the following claims.

What is claimed is:

1. A debug device for embedded systems, wherein, a processor embedded in the embedded system reads a boot program from a flash memory through a data flash interface in order to execute a boot process, the data flash interface being a type of serial interface, and the debug device including:
    a memory transmission interface, which is coupled to the data flash interface, used to receive data transmitted by the data flash interface;
    a data storage module, which is coupled to the memory transmission interface and used to store the data received via the memory transmission interface;
    a data control module, which is coupled to the memory transmission interface and, when a data control signal in the data flash interface is triggered, stores the data transmitted through a data bus of the data flash interface in the data storage module; and
    a display module, which is coupled to the data control module and used to receive a control signal from the data control module, for outputting and displaying the data stored in the data storage module.

2. The debug device for embedded systems as in claim 1, wherein the memory transmission interface is compatible with the data flash interface.

3. The debug device for embedded systems as in claim 2, wherein the data control module determines whether a memory address control signal in the data control signal is triggered, if so causes the data control module to identify the data transmitted in the data bus as the data for a memory address, and stores the memory address in the data storage module.

4. The debug device for embedded systems as in claim 3, wherein the data control module determines whether a memory data read/write control signal in the data control signal is triggered, if so causes the data control module to identify the data transmitted in the data bus as a memory data, and stores the memory data in the data storage module.

5. The debug device for embedded systems as in claim 4, wherein the data control module processes the memory address and the memory data stored in the data storage module into a raw data suitable for debugging, and encodes the raw data into a data suitable for display on the display module.

6. The debug device for embedded systems as in claim 5, wherein the boot program sets at least one test point to record execution results of an initialization of the boot program.

7. The debug device for embedded systems as in claim 6, wherein the execution result of the initialization of the boot program is whether peripheral devices in the embedded systems operate normally.

8. The debug device for embedded systems as in claim 6, wherein the raw data is the execution result of the initialization of the boot program recorded for the test points.

9. The debug device for embedded systems as in claim 1, further including:
    a debug output interface, which is coupled to the data control module, used for receiving the control signal of the data control module to output the data in the data storage module to a computer system.

10. A debug method for embedded systems, wherein a processor embedded in the embedded system reads a boot program from a flash memory through a data flash interface in order to execute a boot process, the data flash interface being a type of serial interface, and the debug method including:
    providing a debug device to determine whether a data control signal in the data flash interface is triggered during an execution of the boot process by the embedded system;
    if so causing the debug device to store the data transmitted through a data bus in the data flash interface to a data storage module;
    encoding the data stored in the data storage module; and
    outputting the encoded data to a display module for display.

11. The debug method for embedded systems as in claim 10, wherein determining whether the data control signal in the data flash interface is triggered comprises determining whether a memory address control signal in the data control signal is triggered, and if so identifying the data transmitted in the data bus as the data for a memory address.

12. The debug method for embedded systems as in claim 11, wherein determining whether the data control signal in the data flash interface is triggered comprises determining whether a memory data read/write control signal in the data control signal is triggered, and if so identifying the data transmitted in the data bus as a memory data.

13. The debug method for embedded systems as in claim 12, further comprising storing the memory address and the memory data into the data storage module, wherein the memory address and the memory data stored in the data storage module are decoded into a raw data suitable for debugging before being encoded.

14. The debug method for embedded systems as in claim 13, wherein encoding the raw data suitable for debugging comprises encoding the raw data into a data suitable for display on the display module.

15. The debug method for embedded systems as in claim 14, wherein the boot program sets at least one test point to record execution results of an initialization of the boot program.

16. The debug method for embedded systems as in claim 15, wherein the execution result of the initialization of the boot program consists of whether the peripheral devices in the embedded systems operate normally.

17. The debug method for embedded systems as in claim 16, wherein the raw data is the execution result of the initialization of the boot program recorded for the test points.

18. The debug method for embedded systems as in claim 10, further including:
    outputting, through a debug output interface, the data stored in the data storage module to a computer system.

19. A debug method for embedded system, wherein a processor embedded in the embedded system reads a boot program from a flash memory through a data flash interface in order to execute a boot process, the data flash interface is a type of serial interface, and the debug method includes:
    providing a debug device to determine whether the data flash interface is idle;
    when the data flash interface is idle, causing the debug device to trigger a debug card program detection signal to the embedded system;
    causing the debug device to output a memory address to a data bus in the data flash interface;
    causing the debug device to determine whether a memory data read control signal in the data flash interface is triggered;

when the memory data read control signal is triggered, causing the debug device to store the data on the data bus of the data flash interface in a data storage module;
encoding the data stored in the data storage module; and
outputting the encoded data to a display module for display.

20. The debug method for embedded systems as in claim 19, further includes:
outputting, through a debug output interface, the data stored in the data storage module to a computer system.

* * * * *